106-74.
01-23-73    AU 116    EX
            XR    3,712,941

United States Patent Office 3,712,941
Patented Jan. 23, 1973

---

3,712,941
HIGHLY SILICEOUS ALKALI METAL SILICATES
Clyde B. Myers, Mentor, Ohio, assignor to Diamond Shamrock Corporation, Cleveland, Ohio
No Drawing. Original application June 21, 1968, Ser. No. 738,771. Divided and this application Dec. 21, 1970, Ser. No. 100,445
Int. Cl. C01b 33/32
U.S. Cl. 423—332         2 Claims

ABSTRACT OF THE DISCLOSURE

A process is described whereby alkali metal silicates having silica:alkali metal oxide weight ratios of at least 4.0:1 are provided by mixing an aqueous alkali metal silicate with an amorphous silica and reacting the resultant mixture at a temperature between about room temperature and at least the temperature at which intumescence occurs. By this method high ratio alkali metal silicates of varying degrees of plasticity and water solubility may be obtained.

REFERENCE TO A CO-PENDING APPLICATION

This is a division of my co-pending application 738,771 filed June 21, 1968, now abandoned.

BACKGROUND OF THE INVENTION

Alkali metal silicates having silica:alkyl metal oxide weight ratios in excess of 3.4:1 are not generally readily available on a commercial basis. In some instances silicates having weight ratios as high as 3.75:1 have been available but these and more siliceous silicates are in limited production and are available only at a premium cost. Furthermore the user of such silicates is limited to the weight ratios available from the manufacturer's plant and these are generally quite limited in number.

For some purposes however, it is necessary or desirable to make use of alkali metal silicates having weight ratios in excess of 4.0:1. One illustration of such a use would be in the insulation industry where foamed alkali metal silicates having a high silica content would be useful in the fabrication of thermal or acoustical insulation having a high resistance to water. Such foams would also be useful as flotation materials or as shock-absorbing materials for dropping fragile items by parachute.

Obviously, the production of foams such as described above requires as a starting material an alkali metal silicate having a relatively low water content, since the product is to be foamed into a rigid material, and a relatively high silica:alkali metal oxide ratio since it is known that the more siliceous silicates are less water soluble in their anhydrous forms. However, in attempting to provide such alkali metal silicates at a reasonable cost, problems have been encountered.

Alkali metal silicates are generally formed by the reaction of an alkaline material and sand at elevated temperatures to provide a silicate glass. However alkali metal silicates having weight ratios in excess of 4.0 have extremely high melting temperatures, e.g., a sodium silicate having a $SiO_2:Na_2O$ weight ratio of 4.5:1 has a melting point of approximately 1235° C. Furnaces capable of reaching such high temperatures are not, however, generally available for the production of silicate materials and the cost of providing such a furnace is prohibitive. Furthermore, even if the furnace were available and the silicate desired was produced, it would have such a low degree of water solubility as to make it essentially impossible to dissolve. Hence it would not be possible to provide the desired alkali metal silicate in a form useful for producing foamed materials.

One method of producing alkali metal silicates having weight ratios in excess of 4.0 may be found in the art. This involves the slow and controlled addition of a dilute silica aquasol to a hot aqueous solution of sodium silicate. This colloidal silica aquasol must be both free from electrolyte and freshly prepared in order for the reaction to proceed satisfactorily. Obviously such a method, however, would have no practical application to the formation of alkali metal silicate for use in producing foamed materials since the resulting silicate would be highly dilute and the cost would be prohibitive due to the extremely high cost of silica aquasols which are free from electrolyte as well as the expense of removing the water from the dilute solution.

Thus to date it has been necessary for the industry to use as a starting material for foamed silicates those alkali metal silicates commercially available having relatively low silica:alkali metal oxide weight ratios, e.g., less than 3.75:1. Consequently, due mainly to the water solubility of such silicate foams, their application has been somewhat limited.

STATEMENT OF THE INVENTION

Therefore it is an object of this invention to provide an alkali metal silicate having a silica:alkali metal oxide weight ratio of at least 4.0:1.

It is a further object of this invention to provide a simple and efficient method for producing alkali metal silicates having a variety of weight ratios of at least 4.0:1.

A still further object of this invention is to provide an economical process for the production of alkali metal silicates having silica:alkali metal oxide weight ratios of at least 4.0:1, which silicates are useful in the production of foamed silicate materials.

These and other objects and advantages of the invention will become apparent to one skilled in the art from the specification and claims which follow.

It has now been found that an alkali metal silicate having a silica:alkali metal oxide weight ratio of at least 4.0:1 may be obtained by intimately mixing an aqueous alkali metal silicate with a finely divided amorphous silica, said amorphous silica being present in at least the amount required to provide, in combination with the silica in the alkali metal silicate, the desired final weight ratio of silica-alkali metal oxide, and reacting the resultant mixture at a temperature between about room temperature and at least the temperature at which intumescence occurs for a period of time sufficient to essentially complete the reaction. By this method an alkali metal silicate having a desired weight ratio in excess of 4.0:1 may be simply and economically obtained. Furthermore by selection of the appropriate temperature at which reaction takes place it is possible to dictate the physical form water solubility of the resultant alkali metal silicate and product.

DESCRIPTION OF THE PREFERRED EMBODIMENTS

By the use of the term "alkali metal silicate" it is intended, of course, to refer primarily to those silicates which are readily available commercially, i.e., the sodium and potassium silicates. However, if required for certain special applications it is also possible to apply the teaching of this invention to the production of other alkali metal silicates such as lithium, rubidium or cesium silicates. Conveniently the alkali metal silicates used will be the commercially available aqueous solutions of alkali metal silicates, e.g., sodium silicates, since a certain quantity of water is required in order to facilitate mixing and reaction as will be explained more fully hereinbelow. Furthermore, it is not critical that the starting alkali metal silicate material have a specific silica-alkali metal oxide weight ratio. However, as a practical consideration it will generally be advisable to use as a starting material an alkali metal silicate having a relatively high silica: alkali metal oxide weight ratio since the alkali metal silicates are generally less expensive than the other reactant, i.e., amorphous silica. For example, a preferred starting material would be a sodium silicate solution containing 38.3% solids and having a $SiO_2:Na_2O$ weight ratio of 3.22:1.0.

Generally speaking, any source of finely divided amorphous silica is useful in the practice of the present invention. Typically, however, because only a limited quantity of water is desired in the system and because of economic factors, the silica used will be that generally available to the industry as silica pigments. These silica are generally relatively impure, containing, typically, 80–90 percent by weight $SiO_2$, the remainder being mainly water, plus relatively minor impurities such as alkali metal salts, metal oxides and the like, which impurities, however, are generally harmless in the practice of the present invention. Illustrative of the silicas useful in the practice of the present invention are Si-Sil, a trademark of the Columbia Southern Chemical Corporation for a hydrated silica pigment and Zeosyl 100, trademark of the J.M. Huber Company. Crystalline sources of silica, even in finely-divided form such as silica flour, are not useful in the practice of the present invention.

It will be obvious to one skilled in the art that the quantity of amorphous silica to be used in combination with the alkali metal silicate depends upon the desired final weight ratio. Therefore, the quantities used will depend upon the alkalinity and solids content of the aqueous alkali metal silicate starting material as well as the silica content of the amorphous silica source. These quantities may be readily calculated at the time of use. As an illustration, an alkali metal silicate having a weight ratio ($SiO_2:Na_2O$) of 4.5:1 may be produced using 110 grams of an aqueous sodium silicate solution, which contains 38.3 percent solids and has a weight ratio of 3.22:1, and 14.3 grams of amorphous silica, containing 90 percent $SiO_2$.

As is set forth hereinabove the first stage in the manufacture of the desired alkali metal silicate involves the intimate mixing of the aqueous alkali metal silicate solution and the amorphous silica, together with any added water. This mixing stage is relatively important to the overall operation. To date the best manner of effecting this mixture has been to slowly add, with constant mixing, the aqueous alkali metal silicate to the amorphous silica. If any additional water is to be present it should be added, preferably, to the alkali metal silicate solution prior to addition to the amorphous silica. During the course of this addition and mixing, the amorphous silica will change from an essentially dry, free-flowing powder to a wetted, viscous material which requires the application of sometimes powerful forces to insure adequate mixing. On a small scale this may be done by hand, for example with a mortar and pestle or by using a spatula, however, on a large scale, commercially available mixers such as blade-type mixers or pug mills are adequate for the purpose. This mixing is continued until such a time as it is obvious that the amorphous silica has been thoroughly wetted and that the silicate has been distributed evenly throughout the amorphous silica. The material may then be transferred from the mixing apparatus for the second phase of the reaction.

The reaction may now be completed and for this purpose three general temperatures of reaction may be employed depending upon the physical properties desired of the ultimate product.

In the first instance, the intimate mixture of amorphous silica and alkali metal silicate, which has already begun to undergo some reaction, may be transferred to a storage vessel and maintained therein at essential room temperature for a period of time until the reaction is substantially complete. Generally speaking, when using a commercial aqueous alkali metal silicate solution and a dry amorphous silica without any added water and attempting to obtain a weight ratio of 4.5:1.0, this reaction will require approximately 1–3 days at room temperature for completion. The final product will be an extremely viscous, but relatively clear semi-plastic, alkali metal silicate having good water solubility. It is possible that a small portion of unreacted amorphous silica may remain in the alkali metal silicate, however, the amounts involved are so small as to be negligible for most purposes. Such as alkali metal silicate is useful by itself for ordinary uses to which highly siliceous alkali metal silicates might be put, such as the fabrication of insulation and refractory cements, or as an intermediate in the formation of silicate foams. By the use of such an intermediate, other ingredients desired to be incorporated into the ultimate foam may be readily admixed because of the workability of the alkali metal silicate. Such physical properties are not available if the alkali metal silicate is obtained by firing at a high temperature.

As an alternate to the first course of action it is also possible to apply moderate amounts of heat to the highly viscous material resulting from the mixing of the aqueous alkali metal silicate and the amorphous silica, this heat serving to speed the reaction and ensuring that the silica will more completely react with the alkali metal silicate as well as allowing the use of somewhat larger amounts of water. By this procedure, however, it is still possible, if the temperature is controlled to a point less than that at which intumescence occurs, to provide an alkali metal silicate having the properties of water solubility and a moderate degree of plasticity. Such a product will have the same uses as the products obtained by the reaction at room temperature, however, the reaction is more rapid and hence somewhat more economic.

The third alternate available is that which will be selected where it is desired that an alkali metal silicate having a high silica:alkali metal oxide weight ratio be obtained, which silicate will have a relatively high degree of water insolubility, comparing favorably to silicates which would be obtained by firing at extremely high temperatures. In this case the mixture of aqueous alkali metal silicate and amorphous silica is placed in a furnace and fired at least to the temperature at which intumescence occurs. Intumescence is understood to mean the foaming of the alkali metal silicate which occurs upon the loss of the water contained in the mixture. Thus it may be considered that the water in the mixture acts as a blowing agent for the foam. Obviously therefore, the temperature must be at least that at which the water bound in the mixture will evaporate at a rapid enough rate to form vapors within the alkali metal silicate-silica mixture. Generally speaking, therefore, intumescence will begin to occur at a temperature of approximately 100° C. The degree of water insolubility which is imparted to the foamed alkali metal silicate will depend upon the completeness of the removal of the water from the mixture. It is found that the alkali metal silicates which may be considered for most purposes to be substantially completely water-soluble are those which have been manufactured by bringing the alkali metal silicate-amorphous silica mixture to a temperature of approximately 315° C. Of course, this foamed alkali metal silicate, which may now be considered to be substantially anhydrous, may be ground into a powder form if the ultimate application thereof requires such a material. One such application would be the production of refractory materials since the silicates of this invention have a melting point comparable to that previously attainable only by firing to the temperatures required to completely dehydrate siliceous water glasses, e.g., in excess of 1100° C.

It will be appreciated by those skilled in the art from the foregoing description that the amounts of water that may be incorporated in the silicate-amorphous silica mixture prior to reaction will vary somewhat. Obviously a larger amount of water will facilitate the mixing operation and in this respect it is desirable. However, excess amounts of water have undesirable and uneconomic side effects. In the first instance, if the amounts of water are too large, reaction at room temperature will not proceed within a reasonable length of time and hence, the application of heat will in most instances be required. Furthermore, if too large quantities of water are used, it will be necessary to provide agitation during the reaction of the silica and the silicate since the silica would tend to separate from the solution. Obviously the provision of such agitation would be impractical especially if the operation is to be conducted at elevated temperatures. For these reasons and for the strictly economic consideration that the water will in most instances have to be removed from the final product, it is not desirable to incorporate large amounts of water. Generally speaking it is convenient to use only that water which is incorporated in the usual commercially available alkali metal silicate solutions, that is, 50–70 percent of the alkali metal silicate solution by weight. However, in those instances where a large quantity of amorphous silica is to be used, as when producing a silicate having an extremely high silica:alkali metal oxide ratio, or when the reaction is to be conducted at an elevated temperature it is possible and sometimes desirable to add up to 10 percent water in addition to that contained in the alkali metal silicate solution, preferably 2–3 percent.

In order that those skilled in the art may more readily understand the present invention and certain preferred embodiments by which it may be carried into effect, the following illustrative examples are afforded.

Example 1

A 5 gram portion of amorphous silica (Zeo–45 SD manufactured by the J. M. Huber Company and containing 89 percent by weight $SiO_2$) is placed on a porcelain dish and there is added thereto, dropwise, 25.4 grams of a commercial sodium silicate solution having a silica:sodium oxide weight ratio of 3.22:1 and a solids content of 38.3 percent. The mixing takes place using a spatula at room temperature (25° C.). After thorough mixing, the mixture has an extremely high viscosity so that when placed in a vessel it assumes the shape, only gradually, of said vessel. The mixture is then placed on a glass dish and put into an oven at 110° C. for 19 hours. Subsequently the partially dried and intumesced sample is placed in an oven and the temperature is raised to 315° C. over a period of 3 hours and is then maintained at this temperature for an additional 2 hours. The resultant silicate product, when ground with a mortar and pestle and dissolved in hot water, followed by filtration, is found to have an $SiO_2$:$Na_2O$ weight ratio of 4.30:1.0. This compares to a theoretical weight ratio of 5.1:1.

Example 2

A second sample is prepared as in Example 1 using in this instance 27.9 grams of the alkali metal silicate solution. In this example the mixture of silica and silicate is heated directly over a period of 3 hours to 315° C. and is maintained at this temperature for 2 hours. The amount of water remaining in the thus-treated sample is found to be 5 percent by weight and the silica:sodium oxide weight ratio is 4.47:1.0 compared to a theoretical weight ratio of 4.96:1.0.

Example 3

A portion of the silica-silicate mixture of Example 2 was placed, without drying at either 110° C. or 315° C., in a glass bottle and then allowed to stand undisturbed at room temperature for 30 days. This sample upon analysis showed that a sodium silicate having a weight ratio of 4.70:1 is formed by this method. Theoretical weight ratio is 4.94:1.0.

Example 4

A 454 gram portion of Zeo–45 SD is placed in a blade-type mixer driven by a ¾ horsepower electric motor geared down to 20 r.p.m. The mixer is turned on and 2542 grams of sodium silicate having a weight ratio of 3.22:1 and a solids content of 38.3 percent is added over a period of one minute. After 45 minutes of mixing a sample is taken and quenched with water. The soluble portion is analyzed and has a weight ratio of 4.50:1.0.

The remainder of the sample is placed in a sealed container. After 24 hours the sample completely dissolves in water and has a weight ratio of 4.86:1.0. The theoretical weight ratio is 4.96.

Examples 5–8

Into a mixer as in Example 4 is placed 79.8 parts of sodium silicate (3.22 $SiO_2$:1 $Na_2O$, 38.3% solids), 14.2 parts of Zeo–45 SD and 6.0 parts water (the water is added to the silicate prior to the addition of the silica). The composition is mixed for 0.75 hour after which time it is placed in a sealed container. This is labeled Example 5.

Example 6 consists of 82.2 parts of the same silicate, 14.7 parts of Zeo–45 SD and 3.1 parts $H_2O$, again mixed for 0.75 hour and sealed.

Example 7 contains 84.8 parts of the silicate and 15.2 parts of Zeo–45 SD mixed at 50° C. for a total of 0.75 hour.

Example 8 is identical to Example 5 with the exception that mixing requires a total of only 0.75 hour at 50° C.

Results, in terms of weight ratios of the soluble portion of the reaction product at various time intervals, are summarized in Table I below.

TABLE I

| Ex. | Reaction at— | | Parts of— | | Added water (parts) | $SiO_2$:$Na_2O$ (weight ratio) |
|---|---|---|---|---|---|---|
| | Time (hours) | Temperature (° C.) | Silicate | Silica | | |
| 5 | 0.75 | 25 | 79.8 | 14.2 | 6.0 | 3.61 |
| | 24 | 25 | 79.8 | 14.2 | 6.0 | 3.79 |
| | 48 | 25 | 79.8 | 14.2 | 6.0 | 4.69 |
| 6 | 0.75 | 25 | 82.2 | 14.7 | 3.1 | 3.30 |
| | 24 | 25 | 82.2 | 14.7 | 3.1 | 3.68 |
| | 48 | 25 | 82.2 | 14.7 | 3.1 | 4.70 |
| 7 | 0.33 | 50 | 84.8 | 15.2 | | 3.70 |
| | 0.75 | 50 | 84.8 | 15.2 | 3.1 | 4.52 |
| 8 | 0.25 | 50 | 79.8 | 14.2 | 6.0 | 3.54 |
| | 0.50 | 50 | 79.8 | 14.2 | 6.0 | 3.65 |
| | 0.75 | 50 | 79.8 | 14.2 | 6.0 | 4.21 |

The present invention has been described with reference to certain preferred and specific embodiments thereof, however, the scope of the invention is not to be so limited since certain changes nad alterations may be made therein which are within the full and intended scope of the appended claims.

I claim:

1. A process of preparing a solid sodium silicate having a $SiO_2$:$Na_2O$ weight ratio in excess of 4.0:1, which process consists essentially of intimately admixing an aqueous sodium silicate containing from about 50–80 percent water and having a $SiO_2$:$Na_2O$ weight ratio of less than 4.0:1 with a finely-divided amorphous silica, the amount of said silica being at least that required, in combination with the sodium silicate, to yield the desired final $SiO_2$:$Na_2O$ weight ratio, and reacting said mixture at from at least the temperature at which intumescence occurs up to about 315° C. for a period of time sufficient to essentially complete the reaction, whereby a foamed, substantially anhydrous and water-insoluble, sodium silicate having a $SiO_2:Na_2O$ weight ratio in excess of 4.0:1 is obtained.

2. A process as in claim 1 wherein the quantities of aqueous sodium silicate and amorphous silica are such as to provide a sodium silicate product having a $SiO_2:Na_2O$ weight ratio of about 4.5:1.

References Cited

UNITED STATES PATENTS

| 1,041,565 | 10/1912 | Arthur | 23—110 X |
| 3,492,137 | 1/1970 | Iler | 106—74 |

EDWARD STERN, Primary Examiner

U.S. Cl. X.R.

106—74